Figure 5:
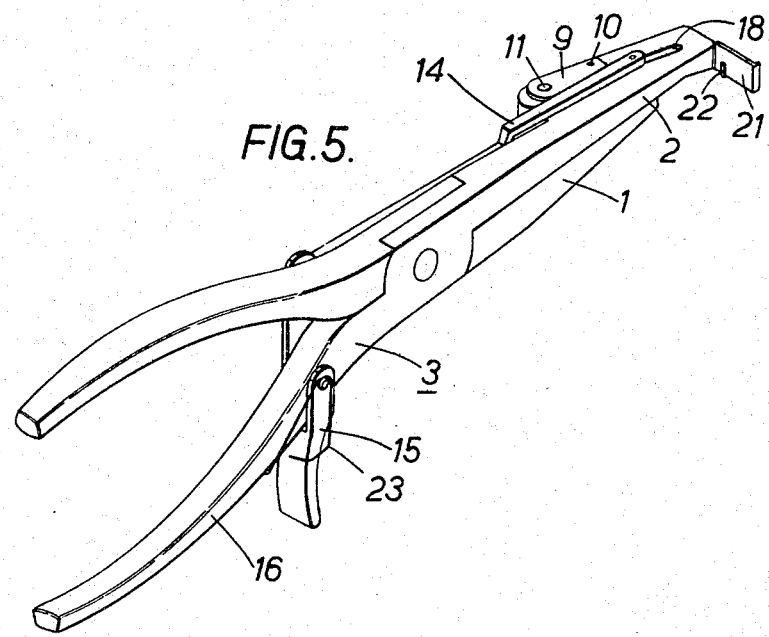

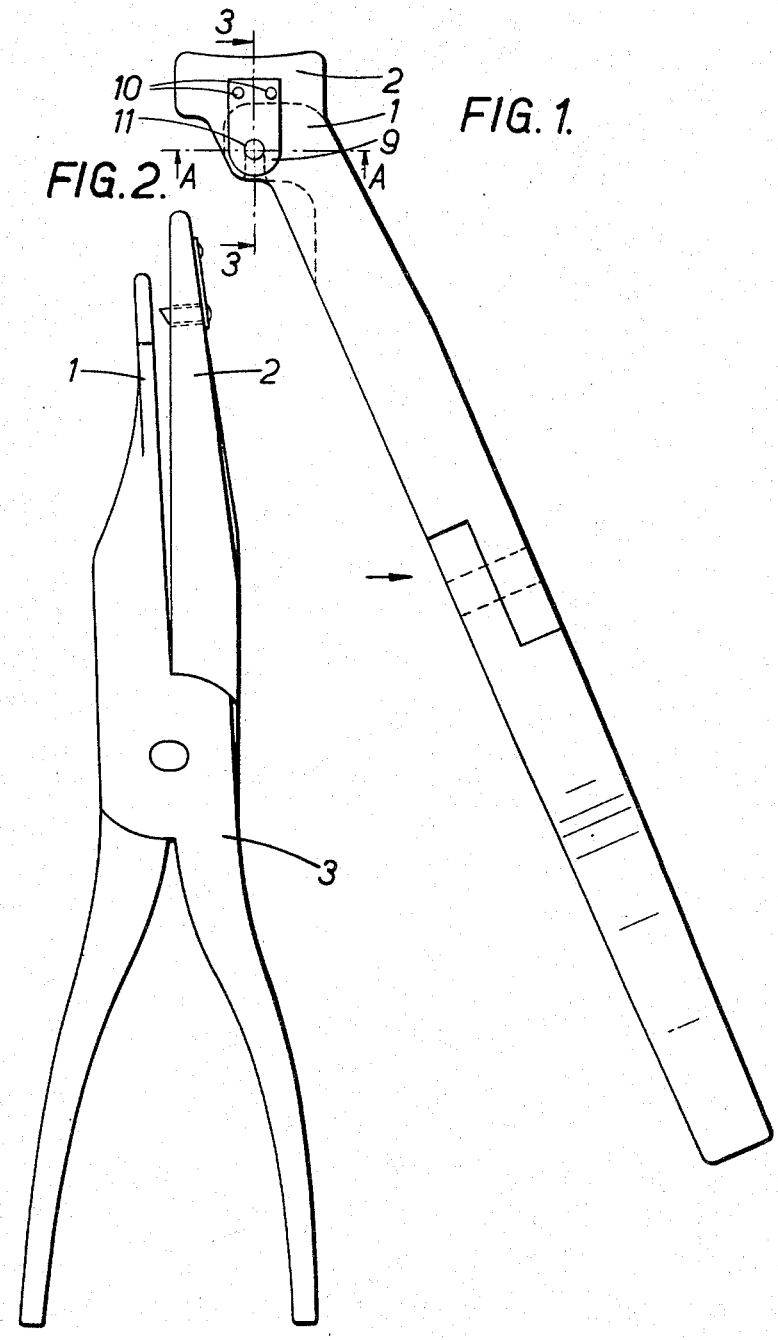

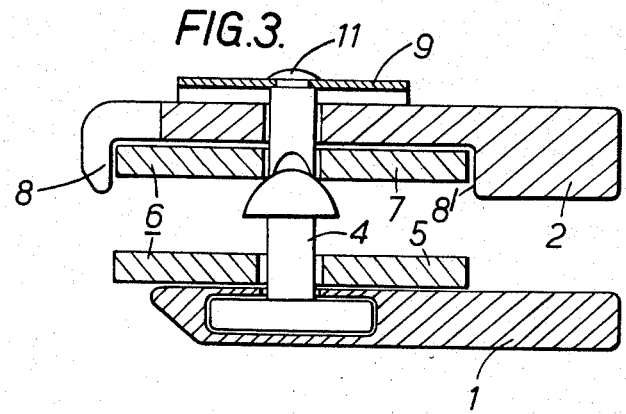
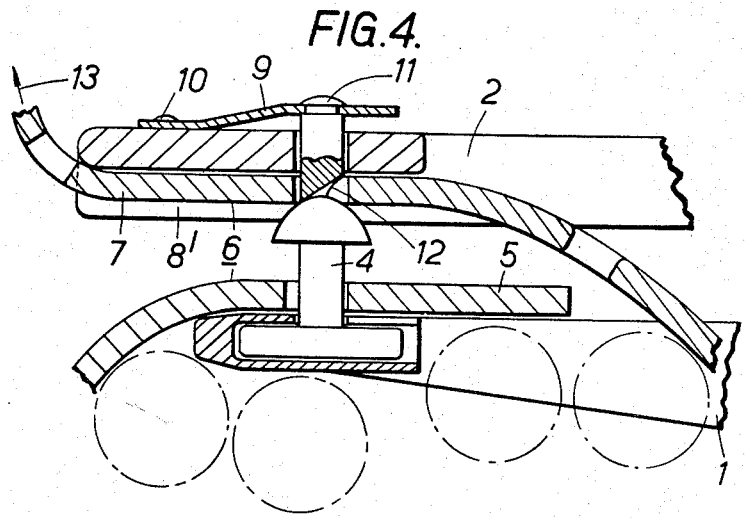

April 20, 1965   N. W. PRICE   3,179,128
CABLE STRAPPING TOOLS
Filed Nov. 14, 1962   5 Sheets-Sheet 3

United States Patent Office 3,179,128
Patented Apr. 20, 1965

3,179,128
CABLE STRAPPING TOOLS
Norman William Price, Newbury, England, assignor to United Kingdom Atomic Energy Authority, London, England
Filed Nov. 14, 1962, Ser. No. 237,611
Claims priority, application Great Britain, Nov. 17, 1961, 41,323/61
12 Claims. (Cl. 140—93.2)

This invention relates to a strapping tool suitable for binding a flexible strap round a loose bundle of electric wires or cables.

At the present time such loose bundles can be bound by using a strap which has a series of equally spaced central holes along its length. The strap is passed round the bundle, overlapped and tightened so that the holes in the overlapped portions are brought into co-incident position, and then it is fixed by means of a suitable stud or rivet which is forced through the coinciding holes.

In practice this operation is difficult to carry out. An operator has to hold the strap tightly in correct position, support the loose bundle of wires, and force the small stud or rivet through the holes, normally by means of a pair of pliers. The operation may have to be carried out in an awkward and inconvenient position, depending on the original run of the wires. The wires or cable, if they are stiff, foul the handle of the pliers and make it very difficult for the operator to get a firm grip to force the stud into position. There are furthermore three main operations to carry out simultaneously; holding the strap tight with holes correctly positioned, supporting the bundle and forcing the stud or rivet into position.

An object of this invention is to provide a strapping tool which carries out, with one handed operation, the steps of holding the strap, maintaining the holes in correct adjacent register after tightening the binding strap, and forcing the stud or rivet into position.

The invention consists in a strapping tool for fixing a binding strap in position round a bundle of wires, cables or the like, by a stud passing through adjacent holes in overlapping portions of the said strap, said holes being part of a series of holes along the length of the said strap, which comprises in combination a first jaw of thin section for positioning between said strap and said bundle, retainer means on the said jaw for retaining the stud in position as an anchor for one end of the said binding strap, a second jaw, guide means on said second jaw for guiding the other end of the said binding strap in over-lapping relationship with the anchored end of the said binding strap, pinion means on the second jaw biased towards the said binding strap, said pinion means being adapted to engage a hole in the free end of the binding strap to prevent movement of the said binding strap in a direction which slackens the said binding strap, and to be retractable to allow movement of the free end of the binding strap in a direction which tightens the said binding strap, the said pinion being positioned to engage the said hole when the said hole is centred on the said stud, and link means linking said jaws and adapted to allow closure thereof to force the said stud into the hole centred thereupon and to retract the said pinion means.

In a further form of the invention the tool is adapted to carry out, in addition, the step of tightening the strap.

Figure 7:
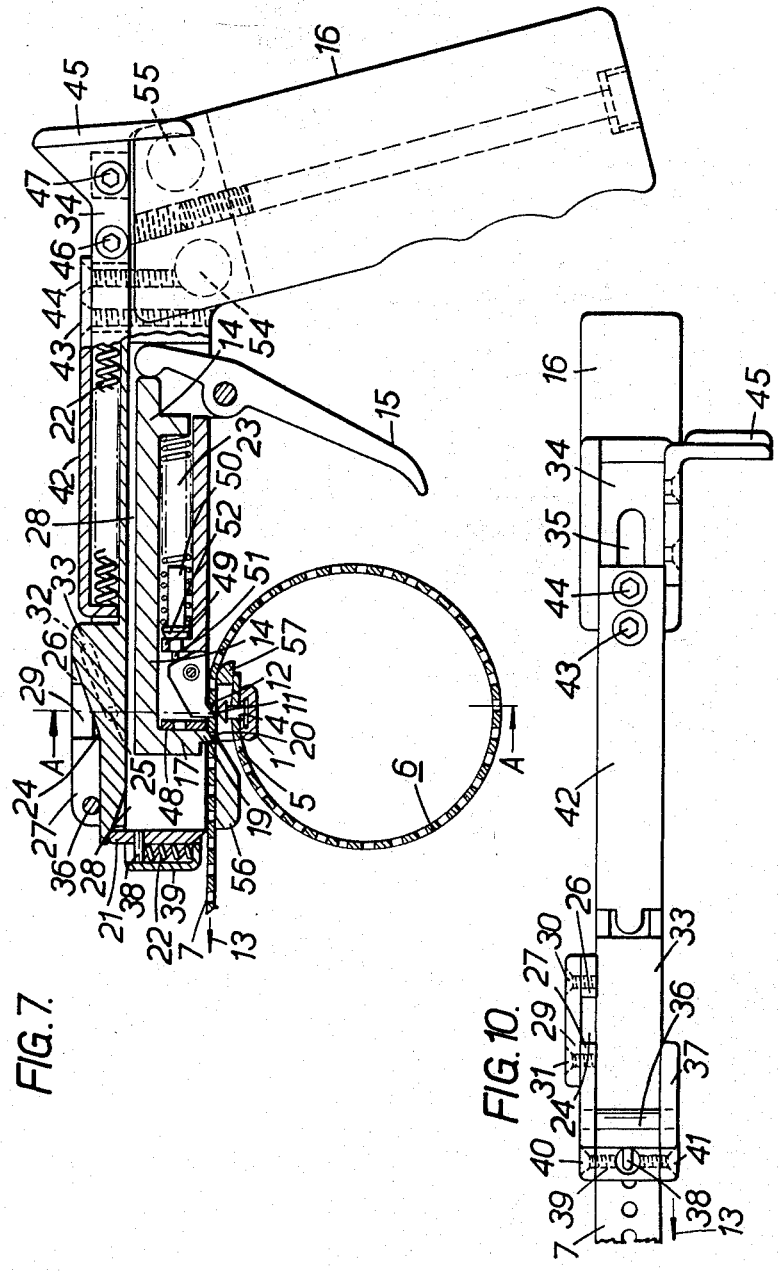
Figure 8:
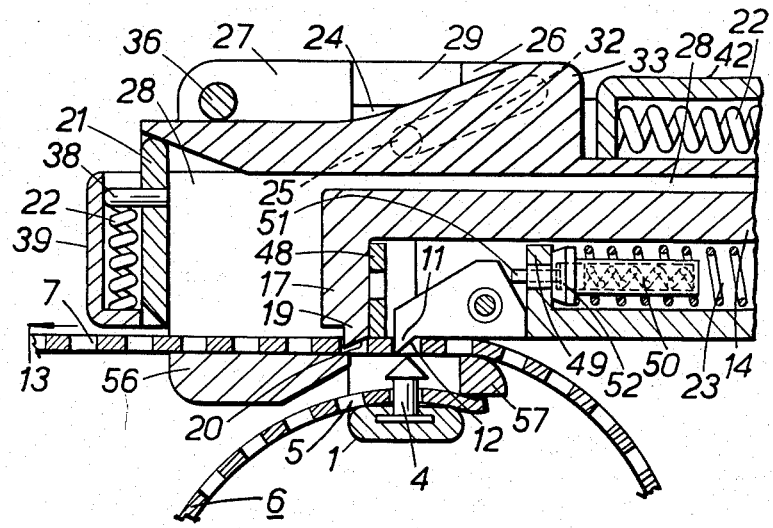
Figure 9:
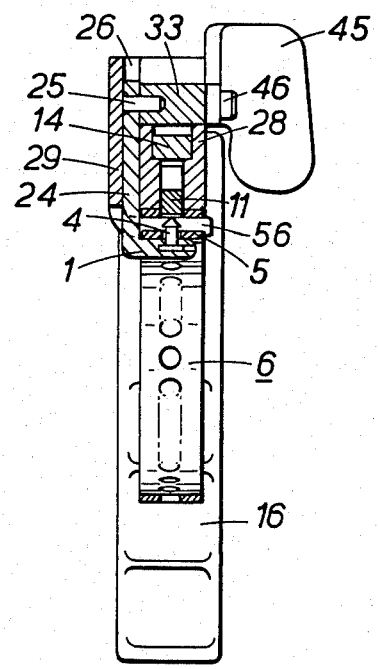

In a further preferred form a guillotine is provided to shear off surplus binding strap. The invention is illustrated in the accompanying drawings in which FIGURE 1 is a plan view of a strapping tool formed as pliers, the strap being tightened by direct hand pulling, FIGURE 2 is a side view of the strapping tool of FIGURE 1, FIGURE 3 is a section through A—A of FIGURE 1 with the addition of the binding strap and stud, FIGURE 4 is a section through 3—3 of FIGURE 1, with the addition of the binding strap and stud, and showing cable to be strapped, FIGURE 5 is a perspective view of strapping pliers having as additional feature, a trigger-operated tensioner and a guillotine, FIGURE 6 is a view of the underside of the pliers of FIGURE 5, FIGURE 7 is a part section elevation of a strapping tool having a pistol grip, a trigger operated tensioner and a thumb operated push rod for closing the jaws and actuating the guillotine, FIGURE 8 is an enlarged portion of FIGURE 7, FIGURE 9 is a section along A—A in FIGURE 7 and FIGURE 10 is a plan view of the strapping tool of FIGURE 7.

In FIGURES 1 to 4 jaws 1 and 2 are part of a pair of long nosed pliers 3. Jaw 1 has a slot for retaining a stud 4 (FIGURES 3 and 4) to which can be anchored the anchored end, end 5 of a strap 6 (FIGURES 3 and 4). Free end 7 of strap 6 runs between guide walls 8 and 8' on jaw 2. A flat spring 9 is held by screws 10 to the outer face of jaw 2 and carries a pin 11 having a sloping end face 12 (FIGURE 4). Arrow 13 indicates the direction in which the strap is pulled to increase tension.

Figure 6:
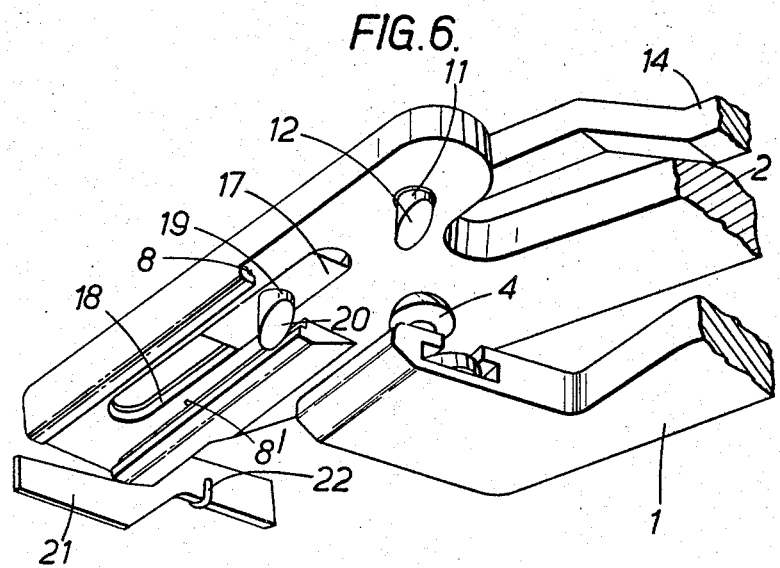

In FIGURES 5 and 6 the reference numerals have the same significance as in FIGURES 1 to 4. A push rod 14 connects a trigger crank 15 pivotally mounted on handle 16 of pliers 3 to a shuttle 17 slidable in a slot 18 in jaw 2. A pin 19 having a sloping end face 20 is spring mounted in shuttle 17. A guillotine 21 is held by a spring 22 at the end of jaw 2. A spring 23 returns the trigger to its original position after operation.

The tool shown in FIGURES 1 to 4 requires two hands for its operation, whereas the tool shown in FIGURES 5 and 6 can be operated by one hand. To use the tools, a stud is slipped into the lower jaw and the strap is anchored at one end by the stud. The lower jaw 1 is placed against the cables or the like to be strapped. The free end of the strap is passed round the cables or the like and between the guides of the upper jaw.

The strap is tightened and then held by the stop pin 11 which is so positioned that the holes in overlapping portions of the strap are maintained in adjacent register. Closure of the jaws forces the stud through the adjacent hole in the strap.

In FIGURES 7 to 9 jaw 1 has an arm 24 having a pin 25 fixed therein. Arm 24 is slidably held between guide walls 26 and 27 which are part of a main body member 28, and a cover plate 29 fixed by screws 30 and 31 to the guide walls 26 and 27 respectively.

Pin 25 is slidable in an inclined slot 32 in a head 33 of a thumb-operable slide 34 having a slot 35. A fixed pin 36 is mounted at one end in guide wall 27 and at the other end in a wall portion 37 forming part of main body member 28. Pin 36 passes across head 33 and prevents its running off main body member 28. Head 33 bears against a guillotine 21 having a return spring 22 which bears against a pin 38 fixed in guillotine 21. A block 39 is held by screws 40 and 41 to main body member 28 and is drilled to contain spring 22.

A coil spring 22 is held in compression by a cover strip 42, fixed by screws 43 and 44 passing through slot 35 to main body member 28, and the slide 34 so that the slide 34 is biased to hold the pin 25 at the end of the slot 32 which is nearest the guillotine 21. A thumb-pressure pad 45 is fixed to slide 34 by screws 46 and 47.

A push rod 14 is biased against a trigger crank 15 by a coil spring 23. Push rod 14 rests on two walls 48 and 49 which are part of body member 28. A pin 50 has a thin extension 51 passing through a hole in wall 49 and bearing against a pawl 11 pivotably mounted in body member 28. Pin 50 has a shoulder portion 52 against which bears one end of spring 23.

Pawl 11 has a sloping end face portion 12 in a hole in strap 6 and push rod 14 has a crank portion 17 terminating in a pin portion 19 having a sloping end face 20 in another hole in strap 6.

A handle 16 is fixed by screws 54 and 55 to main body member 28.

A platform 56 integral with body 28 is located adjacent the guillotine 21. Cover plate 29 has an anglepiece 57 to support strap 6.

The operation of this tool is simple. Stud 4 is first slipped into jaw 1 and one end of the binding strap anchored to it by operating thumb pad 45. The strap is passed round the wires to be bound and is then passed over the angle piece 57, under the pawl 11, under crank portion 17, over platform 56 and under guillotine 21. The components are aligned so that this operation is a single feed operation.

Squeezing trigger 15 causes the push rod 14 to move forward and tighten the strap, the pawl riding up on the strap because of sloping face 12. When the trigger is released the push rod 14 rides up on its sloping face 20 and is returned to its original position by the spring 23 but the strap engages pawl 11 and is kept in position. The pawl is located so that it positions a hole immediately above the stud 4. Thumb pressure on pad 45 forces slide 34 forwards and causes pin 25 to slide along slot 32 thereby lifting jaw 1 and forcing the stud 4 into the adjacent hole in the strap. This also lifts the pawl 11 out of hole thereby releasing the strap. Movement of slide 34 also forces the guillotine 21 down to cut the strap.

I claim:

1. A strapping tool for fixing a binding strap in position round a bundle of wires, cables or the like, by a stud passing through adjacent holes in overlapping portions of the said strap, said holes being part of a series of holes along the length of the said strap, which comprises in combination a first jaw of thin section for positioning between said strap and said bundle, retainer means on the said jaw for retaining the stud in position as an anchor for one end of the said binding strap, a second jaw, guide means on said second jaw for guiding the other end of the said binding strap in overlapping relationship with the anchored end of the said binding strap, pinion means on the second jaw biased towards the said binding strap, said pinion means being adapted to engage a hole in the free end of the binding strap to prevent movement of the said binding strap in a direction which slackens the said binding strap, and to be retractable to allow movement of the free end of the binding strap in a direction which tightens the said binding strap, the said pinion being positioned to engage the said hole when the said hole is centred on the said stud, and link means linking said jaws and adapted to allow closure thereof to force the said stud into the hole centred thereupon and to retract the said pinion means.

2. A strapping tool as claimed in claim 1 in which the said pinion means has a sloping face adapted to ride up one side of a hole to cause retraction of the pinion from the said hole.

3. A strapping tool for fixing a binding strap in position round a bundle of wires, cables or the like, by a stud passing through adjacent holes in overlapping portions of the said strap, said holes being part of a series of holes along the length of the said strap, which comprises in combination a first jaw of thin section for positioning between said strap and said bundle, retainer means on the said jaw for retaining the stud in position as an anchor for one end of the said binding strap, a second jaw, guide means on said second jaw for guiding the other end of the said binding strap in overlapping relationship with the anchored end of the said binding strap, tightening means having a pin adapted to engage a hole in the guided end of the said binding strap and move the said guided end in a direction which tightens the said binding strap, pinion means on the second jaw biased towards the said binding strap, said pinion means being adapted to engage a hole in the free end of the binding strap to prevent movement of the said binding strap in a direction which slackens the said binding strap, and to be retractable to allow movement of the free end of the binding strap in a direction which tightens the said binding strap the said pinion being positioned to engage the said hole when the said hole is centred on the said stud, and link means linking said jaws and adapted to allow closure thereof to force the said stud into the hole centred thereupon and to retract the said pinion means.

4. A strapping tool as claimed in claim 3 in which the said pin has a sloping face adapted to ride up the inside side of a hole in a direction towards the anchored end of the said binding strap.

5. A strapping tool for fixing a binding strap in position round a bundle of wires, cables or the like, by a stud passing through adjacent holes in overlapping portions of the said strap, said holes being part of a series of holes along the length of the said strap, which comprises in combination a first jaw of thin section for positioning between said strap and said bundle, retainer means on the said jaw for retaining the stud in position as an anchor for one end of the said binding strap, a second jaw, guide means on said second jaw for guiding the other end of the said binding strap in overlapping relationship with the anchored end of the said binding strap, tightening means having a pin adapted to engage a hole in the guided end of the said binding strap and move the said guided end in a direction which tightens the said binding strap, pinion means on the second jaw biased towards the said binding strap, said pinion means being adapted to engage a hole in the free end of the binding strap to prevent movement of the said binding strap in a direction which slackens the said binding strap, and to be retractable to allow movement of the free end of the binding strap in a direction which tightens the said binding strap the said pinion being positioned to engage the said hole when the said hole is centred on the said stud, and link means linking said jaws and adapted to allow closure thereof to force the said stud into the hole centred thereupon and to retract the said pinion means and a guillotine for shearing the said binding strap at a predetermined distance from the said stud to remove surplus binding strap.

6. A strapping tool for fixing a binding strap in position round a bundle of wires, cables, or the like, by a stud passing through adjacent holes in overlapping portions of the said strap, said holes being part of a series of holes along the length of the said strap, which comprises in combination a first jaw of thin section for positioning between the said strap and the said bundle, retainer means on said first jaw for retaining said stud in position as an anchor for one end of the said binding strap, a second jaw, a rigid body member in fixed space relationship with one of said jaws and in variable space relationship with the other of said jaws, a handle rigidly attached to said rigid body member and forming therewith a pistol-like configuration, guide means on said second jaw for guiding the end, other than the anchored end, of the said binding strap in overlapping relationship with the anchored end of the said binding strap, pinion means on the second jaw biased towards the said binding strap, said pinion means being adapted to engage a hole in the free end of the binding strap to prevent movement of the said binding strap in a direction which slackens the said binding strap and said pinion means being adapted to be retractable to allow movement of the free end of the said binding strap in a direction which tightens the said binding strap, the said pinion being positioned to engage the said hole when the said hole is centred on the said stud, link means linking said jaws and adapted to allow closure thereof to force the said stud into the said hole and retract the said pinion means, a tightening means having a pin adapted to engage a hole in the guided end of the said binding strap and move the said guided end in a direction which tightens the said binding strap, a guillotine for shearing the said binding strap at a predetermined distance from the said stud to remove surplus binding strap, and two actuator means, one actuator means being a trigger pivotally mounted to the said rigid body for finger-operation and the other actuator means being movably mounted on the said body for thumb-operation, one of the said actuator means being adapted to actuate the tightening means and the other actuator means being adapted to close the said jaws and to actuate the guillotine.

7. A strapping tool as claimed in claim 6 in which the first jaw is part of an arm slidably mounted on the said rigid body and the second jaw is in fixed space relationship with the said rigid body.

8. A strapping tool as claimed in claim 6 in which the said trigger is adapted to operate the tightening means and the thumb-operated actuator means is adapted to operate the guillotine and close the said jaws.

9. A strapping tool as claimed in claim 6 in which the said pinion means comprises a pawl pivotally mounted in the said rigid body and biased to engage a hole in the said binding strap, said pawl having a sloping face in the direction along the said binding strap to the anchored end thereof so that a tightening movement of the said binding strap causes the said sloping face to ride up one side of the said hole and retract the pawl therefrom.

10. A strapping tool as claimed in claim 6 including a guillotine for shearing the said binding strap at a predetermined distance from the stud to remove the surplus binding strap.

11. A strapping tool as claimed in claim 10 in which the thumb-operated actuator is adapted to close the said jaws and to actuate the guillotine, the said thumb-operated actuator comprising a push rod slidably mounted on the said rigid body and biased to fully open the said jaws, said push rod having a head at one end and a thumb-pressure pad at the other, the said head having surfaces inclined at an angle to the sliding direction to close the said jaws and actuate the said guillotine.

12. A strapping tool as claimed in claim 10 in which one of the actuator means is adapted to close the jaws and actuate the guillotine.

References Cited by the Examiner

UNITED STATES PATENTS

| | | | |
|---|---|---|---|
| 181,052 | 8/76 | De Gray | 140—93.2 |
| 1,811,108 | 6/31 | Bayer | 140—93.2 |

CHARLES W. LANHAM, *Primary Examiner.*